US007289473B1

(12) United States Patent
Padovani et al.

(10) Patent No.: US 7,289,473 B1
(45) Date of Patent: Oct. 30, 2007

(54) PILOT REFERENCE TRANSMISSION FOR A WIRELESS COMMUNICATION SYSTEM

(75) Inventors: Roberto Padovani, San Diego, CA (US); Peter J. Black, San Diego, CA (US); Nagabhushana T. Sindhushayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 946 days.

(21) Appl. No.: 09/702,142

(22) Filed: Oct. 30, 2000

Related U.S. Application Data

(63) Continuation-in-part of application No. 09/575,073, filed on May 19, 2000, which is a continuation-in-part of application No. 08/963,386, filed on Nov. 3, 1997.

(60) Provisional application No. 60/163,350, filed on Nov. 3, 1999.

(51) Int. Cl.
*H04Q 7/00* (2006.01)
*H04J 3/06* (2006.01)

(52) U.S. Cl. ............... 370/332; 370/350; 370/333; 370/232; 370/335

(58) Field of Classification Search ............... 370/335, 370/342, 350, 347, 337, 330, 332, 454, 329, 370/345; 375/130, 137, 140, 144, 146, 147, 375/348, 354, 367
See application file for complete search history.

(56) References Cited

U.S. PATENT DOCUMENTS

| | | | |
|---|---|---|---|
| 5,680,395 A | * | 10/1997 | Weaver et al. ............ 370/331 |
| 5,764,687 A | | 6/1998 | Easton |
| 5,764,899 A | * | 6/1998 | Eggleston et al. ......... 709/203 |
| 5,787,133 A | * | 7/1998 | Marchetto et al. ........ 375/366 |
| 5,845,212 A | * | 12/1998 | Tanaka .................... 455/437 |

(Continued)

FOREIGN PATENT DOCUMENTS

EP        0924878        6/1999

(Continued)

OTHER PUBLICATIONS

U.S. Appl. No. 09/575,073, entitled "High Data Rate Wireless Packet Data Communications System," filed May 19, 2000. Paul E. Bender, et al., QUALCOMM Inc., San Diego, California (USA).

(Continued)

*Primary Examiner*—Chirag G. Shah
(74) *Attorney, Agent, or Firm*—Jian Ma; Thomas R. Rouse

(57) ABSTRACT

A pilot reference transmission scheme well suited for high data rate wireless communication systems is disclosed. To maximize the amount of interference from transmissions from neighboring transmission sources (e.g., access points or base stations) during the pilot interval, and hence minimize the amount of interference from non-transmitting sources during the data intervals, the pilot references are transmitted in bursts at predetermined time intervals, and the pilot bursts from the access points are synchronized. This results in maximum interference contributions from non-transmitting neighboring access points, facilitating reliable estimation of worst case carrier-to-interference (C/I), and further allows the receiving devices (e.g., access terminals) to easily recognize the bursts as pilot reference. In one embodiment, each access point transmits the pilot bursts at or near its maximum transmit power level and no user-specific data is transmitted during the pilot bursts.

38 Claims, 7 Drawing Sheets

U.S. PATENT DOCUMENTS

| | | | |
|---|---|---|---|
| 5,862,132 A * | 1/1999 | Blanchard et al. | 370/342 |
| 5,920,551 A | 7/1999 | Na et al. | 370/335 |
| 5,940,765 A * | 8/1999 | Haartsen | 455/462 |
| 6,175,558 B1 | 1/2001 | Miya | |
| 6,470,044 B1 * | 10/2002 | Kowalski | 375/148 |
| 6,483,825 B2 * | 11/2002 | Seta | 370/335 |
| 6,563,809 B1 * | 5/2003 | Proctor et al. | 370/335 |
| 6,567,461 B1 * | 5/2003 | Moon et al. | 375/145 |
| 6,574,211 B2 * | 6/2003 | Padovani et al. | 370/347 |
| 6,574,266 B1 * | 6/2003 | Haartsen | 375/133 |
| 6,574,267 B1 * | 6/2003 | Kanterakis et al. | 375/141 |
| 6,717,926 B1 * | 4/2004 | Deboille et al. | 370/330 |

OTHER PUBLICATIONS

U.S. Appl. No. 08/963,386, entitled "Method and Apparatus for High Rate Packet Data Transmission," filed Nov. 3, 1997. Paul E. Bender, et al., QUALCOMM Inc., San Diego, California (USA).

Ariyavisitakul, et al. "Network Synchronisation of Radio Ports in Wireless Personal Communications" *Electronic Letters* 28(25): 2312-2314 (1992).

Adachi, F. et al., "Wideband multi-rate DS-CDMA for next generation mobile communications systems," *Wireless Communications Conference, 1997., Proceedings*, Aug. 11-13, 1997 pp. 57-62.

* cited by examiner

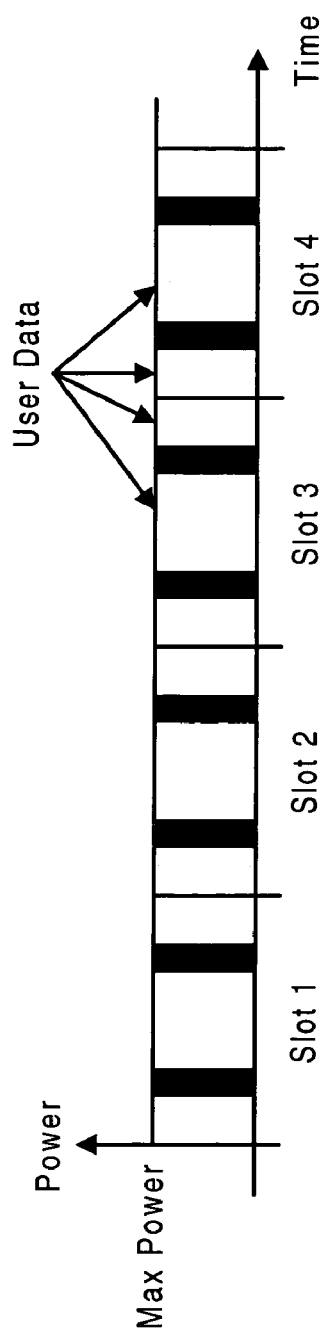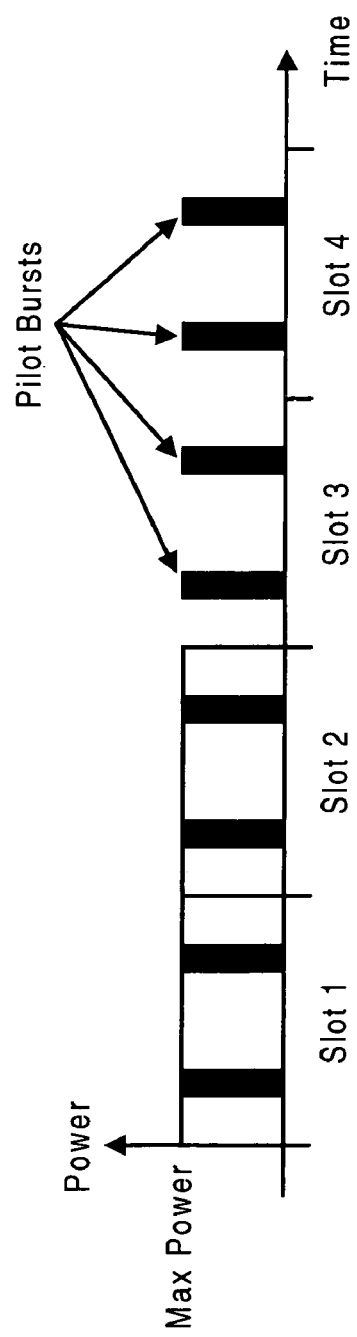

PILOT REFERENCE TRANSMISSION FOR A WIRELESS COMMUNICATION SYSTEM

CROSS REFERENCE TO RELATED APPLICATIONS

This application claims the benefit of provisional U.S. Application Ser. No. 60/163,350, entitled "HIGH DATA RATE SYSTEM AND TECHNOLOGY," filed Nov. 3, 1999, which is incorporated herein by reference in its entirety for all purposes.

This application is further a continuation-in-part of U.S. patent application Ser. No. 08/963,386, entitled "METHOD AND APPARATUS FOR HIGH RATE PACKET DATA TRANSMISSION," filed Nov. 3, 1997, and U.S. patent application Ser. No. 09/575,073, entitled "HIGH DATA RATE WIRELESS PACKET DATA COMMUNICATIONS SYSTEM," filed May 19, 2000, both of which are assigned to the assignee of the invention and incorporated herein by reference.

BACKGROUND OF THE INVENTION

I. Field of the Invention

The present invention relates to data communication. More particularly, the present invention relates to a novel and improved pilot reference transmission scheme for use in a wireless communication system.

II. Description of the Related Art

In a wireless communication system, a pilot reference is often transmitted from a transmission source to a receiving device to assist the receiving device performs a number of functions. The pilot reference is typically a predetermined data pattern processed (e.g., covered and spread) in a known manner. The pilot reference can be used at the receiving device to estimate the quality of the transmission link, coherently demodulate the received transmissions, and perform other functions.

A wireless communication system such as a code division multiple access (CDMA) system or a time division multiple access (TDMA) system (e.g., a Global System for Mobile Communications (GSM) system) typically includes a number of base stations that transmit to a number of remote terminals. Each base station is designed to cover a particular coverage area and transmits to the remote terminals within its coverage area. For systems in which neighboring base stations transmit on the same frequency band to improve spectral efficiency, such as many CDMA-based systems, the transmissions from each base station act as interference to those of neighboring base stations, and possibly to its own transmissions due to multipath. This interference degrades the quality of the transmissions received at a remote terminal, including the pilot transmission.

For the conventional IS-95 CDMA system, a pilot reference is continuously transmitted on a dedicated pilot channel at a particular (relatively low) transmit power level. The remote terminal receives and processes the forward link signal to isolate the pilot channel, and further processes the pilot channel to recover the pilot reference. The interference from these other transmissions can affect the quality of the received pilot reference. This interference is worse when the orthogonality between the pilot channel and the traffic channels used for the data transmissions is lost due to, for example, multipath.

The pilot reference transmission scheme used for the IS-95 CDMA system is adequate for voice communication since the data rate is low, which allows the remote terminal more time to process the pilot reference. However, for a high-speed data transmission system in which the link condition is required to be accurately estimated within a short period of time, this continuous low-level pilot reference is not adequate.

As can be seen, a pilot reference transmission scheme that can provide a high quality pilot reference to the remote terminals and allow a remote terminal to quickly and accurately estimate the link condition is highly desirable.

SUMMARY OF THE INVENTION

The present invention provides a novel and improved pilot reference transmission scheme having various advantages over conventional schemes and is well suited for high data rate wireless communication systems. In accordance with an aspect of the invention, to maximize the amount of interference from transmissions from neighboring transmission sources (e.g., access points or base stations) during the pilot interval, and hence minimize the amount of interference from non-transmitting sources during the data intervals, the pilot references are transmitted in bursts at predetermined time intervals, and the pilot bursts from the access points are synchronized. The transmission of pilot bursts from the access points at the same predetermined time intervals results in maximum interference contributions from non-transmitting neighboring access points, facilitating reliable estimation of worst case C/I, and further allows the receiving devices (e.g., access terminals or remote terminals) to easily recognize the bursts as pilot reference.

In accordance with another aspect of the invention, each access point transmits the pilot bursts at or near its maximum transmit power level, if at all, and no user-specific data is transmitted during the pilot bursts. As a result, the pilot bursts are received at the access terminals only in the presence of pilots from other access points and are not affected by other data transmissions. With this pilot reference transmission scheme, the access terminals do not need to subtract the effect of data transmissions since these do not occur during the pilot bursts. This results in a signal-to-noise ratio for the pilot reference that represents the minimum signal-to-noise ratio during the data transmission from the given access point. This aids in rapid and reliable estimation of worst case carrier-to-interference (C/I).

A specific embodiment of the invention provides a method for transmitting pilot references from a number of transmission sources (e.g., access points or base stations). In accordance with the method, one or more signals indicative of a time reference for the communication system are received at each transmission source. The time reference can be derived from a Global Positioning System (GPS) satellite constellation. Pilot bursts for a pilot reference are generated at each transmission source (in a manner described below) and transmitted. The pilot bursts from the transmission sources are in synchronization with the system time reference and are aligned in time at the time of transmission.

The pilot bursts can be generated and transmitted at predetermined time intervals. To minimize interference from data transmissions, the pilot bursts can be transmitted at or near the maximum transmit power level of the transmission source and in the absence of any data transmission.

Other aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 2B and 2C are diagrams of an embodiment of an active slot format and an idle slot format, respectively, for transmission from an access point;

DETAILED DESCRIPTION OF THE SPECIFIC EMBODIMENTS

Figure 1:
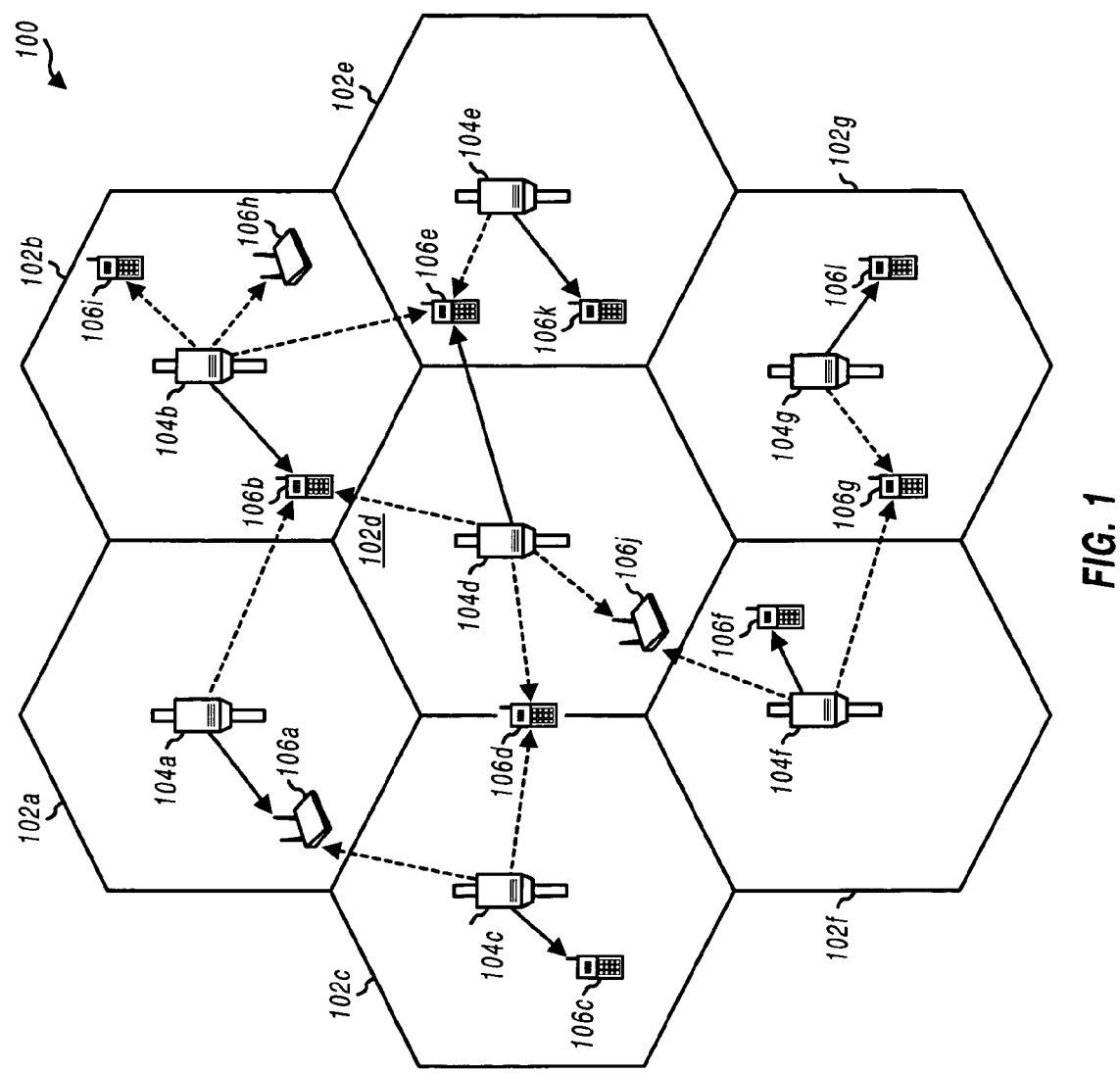
FIG. 1 is a diagram of a wireless communication system that supports a number of users and transmits pilot references.

FIG. 1 is a diagram of a wireless communication system 100 that supports a number of users and transmits pilot references. System 100 provides communication for a number of cells 102a through 102g, with each cell 102 being serviced by a corresponding access point 104 (which may also be referred to as a base station). Various access terminals 106 (which may also be referred to as remote terminals or mobile stations) are dispersed throughout the system.

In an embodiment, each access terminal 106 may communicate with one access point 104 on the forward link at any given moment, and may communicate with one or more access points on the reverse link depending on whether the access terminal is in soft handoff. The forward link (i.e., downlink) refers to transmission from the access point to the access terminal, and the reverse link (i.e., uplink) refers to transmission from the access terminal to the access point. System 100 may be designed to conform to a particular CDMA standard or design, such as the High Data Rate (HDR) design described in the aforementioned U.S. patent application Ser. No. 08/963,386.

In FIG. 1, a solid line with an arrow indicates a user-specific data (or simply, "data") transmission from an access point to an access terminal. A broken line with an arrow indicates that the access terminal is receiving the pilot reference and other signaling (collectively, "pilot") but no user-specific data transmission from the access point. As shown in FIG. 1, access point 104a transmits data to access terminal 106a on the forward link, access point 104b transmits data to access terminal 106b, base station 104c transmits data to access terminal 106c, and so on. The uplink communication is not shown in FIG. 1 for simplicity.

As noted above, the pilot references transmitted from the access points may be used for a number of functions. For the HDR system, the pilot references are used to estimate the link conditions and to determine the particular access point having the best link to the access terminal. The pilot reference is also used to determine the highest data rate supported by that best link. For the HDR system, a pilot reference transmission scheme that allows the access terminal to quickly and accurately estimate the quality of the pilot references would be highly beneficial and may provide improved system performance.

As shown in FIG. 1, an access terminal may receive transmissions from a number of access points. For example, access terminal 106b concurrently receives data and pilot transmissions from access point 104b and pilot transmissions from access points 104a and 104d. For CDMA-based system such as the HDR system, the transmissions from neighboring access points occur over the same frequency band. Thus, each transmission from each access point acts as interference to other transmissions from that access point and neighboring access points.

In accordance with an aspect of the invention, to accurately estimate the maximum amount of interference from transmissions from neighboring access points, the pilot references are transmitted in bursts at predetermined intervals, and the pilot bursts from the access points are synchronized. The transmission of pilot bursts from the access points at the same predetermined time intervals results in maximum interference contributions from non-transmitting neighboring access points, facilitating reliable estimation of worst-case carrier-to-interference (C/I) ratio. The transmission of pilot bursts at the predetermined time intervals further allows the access terminals to easily recognize the bursts as pilot reference.

In accordance with another aspect of the invention, each access point transmits the pilot bursts at or near its maximum transmit power level, if at all, and no user-specific data is transmitted during the pilot bursts. As a result, the pilot bursts are received at the access terminals only in the presence of pilots from other access points and are not affected by other data transmissions. With this pilot reference transmission scheme, the access terminals do not need to subtract the effect of data transmissions since these do not occur during the pilot bursts, which is generally true for the conventional IS-95 CDMA system. This results in accurate estimate of the signal strength from a given pilot, as well as the maximum interference power from other base stations, which aids in reliable estimation of worst-case C/I.

Each access terminal processes the pilot references from the access points and determines the link conditions to these access points based on the received pilot bursts. For the HDR system, the access terminal determines the access point having the best signal quality, based on the received the pilot references, and further determines the highest data rate supported by the best access point. The access terminal may then request for a data transmission at the highest supported data rate from this best access point.

Figure 2A:
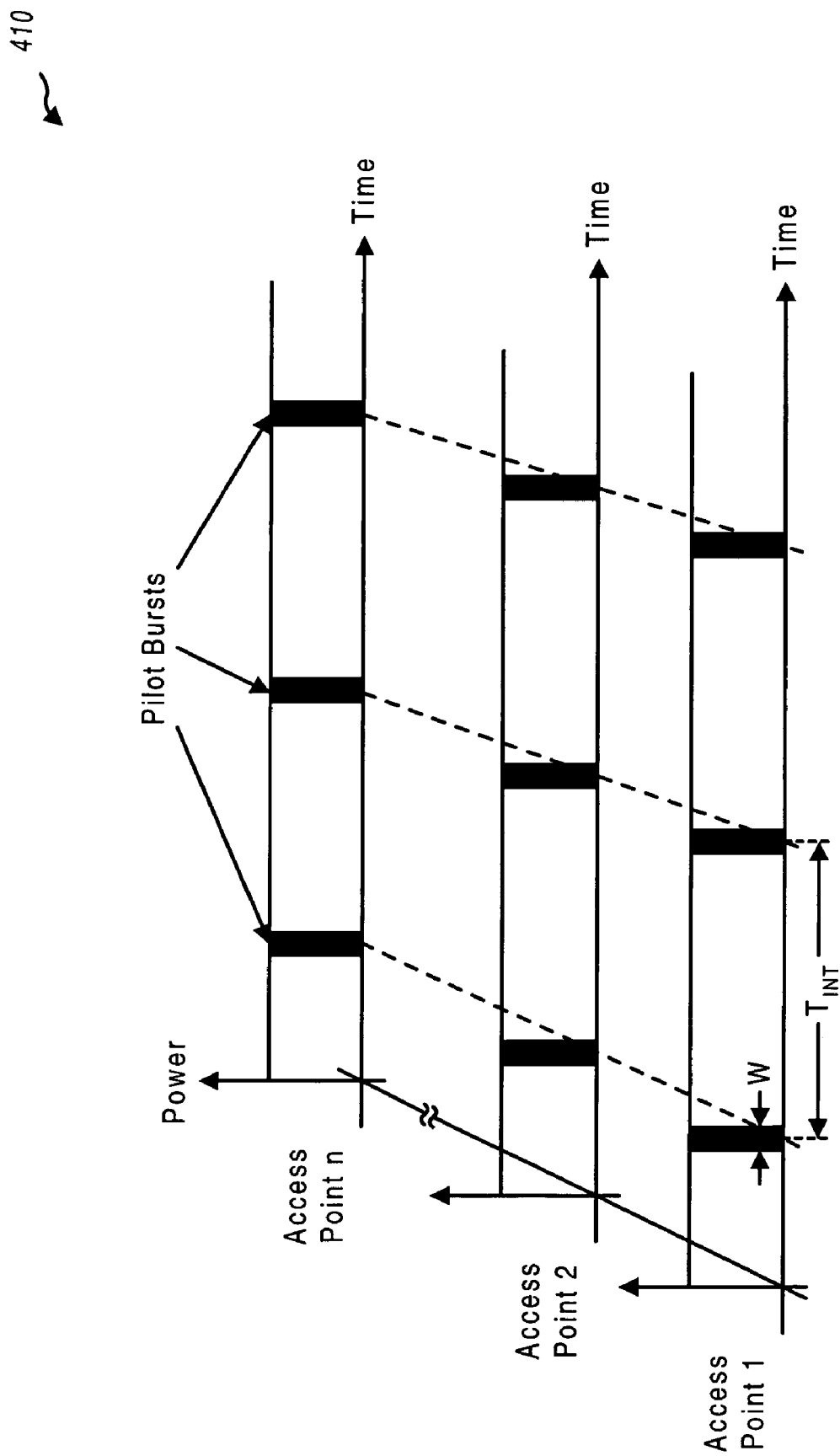
FIG. 2A is a diagram of a pilot reference transmission scheme in accordance with an embodiment of the invention.

FIG. 2A is a diagram of a pilot reference transmission scheme in accordance with an embodiment of the invention. FIG. 2A shows the transmission of pilot references from a number of access points. In this embodiment, the pilot references are transmitted in bursts of particular width (W) at predetermined time intervals ($T_{INT}$). As indicated in FIG. 2A, the timing of the access points is synchronized such that the pilot bursts are approximately aligned at the time of their transmission. In this transmission scheme, the pilot references from the access points can be received at an access terminal at approximately the same instance in time, with any timing skew between the access points being due to differences in transmission delays and other factors.

Thus, as shown in FIG. 2A, the pilot bursts from neighboring access points can be transmitted at predetermined time intervals and synchronized to reduce the amount of interference from data transmissions. The synchronization of the pilot transmissions from neighboring access points can be achieved in a manner described in further detail below.

In an embodiment, the pilot references from neighboring access points can be differentiated from one another by spreading the pilot data from each access point with a pseudo-noise (PN) sequence having a different offset (which is implemented in the HDR system).

At the access terminal, the pilot reference from a selected access point can be recovered by processing the received signal in a manner complementary to that performed at the access point. The processing at the access terminal may include: (1) correlating the received samples with the pilot data pattern for the pilot reference being recovered, (2) decovering the samples with the same orthogonal code used for the pilot at the selected access point, (3) despreading the samples with the same PN sequence at the same time offset, or a combination thereof. This complementary processing recovers the pilot reference from the selected access point and removes the pilot references from other access points. Typically, only small residual amounts of undesired pilot references remain after the complementary processing and are generally due to loss in orthogonality in the communication links caused by, for example, multipath.

FIG. 2B is a diagram of an embodiment of a slot format for transmission from an access point and which supports the pilot reference transmission scheme of the invention. This slot format is advantageously employed in the HDR system. Other slot formats may also be used and are within the scope of the invention.

As shown in FIG. 2B, the transmission from the access point is divided into slots, with each slot corresponding to a particular time interval and including a particular number of chips. For the HDR system, each slot has a duration of 1.67 msec and includes 2048 chips. In the specific embodiment shown in FIG. 2B, each slot includes two pilot bursts, one pilot burst for each half-slot and with each pilot burst being located at the center of the half-slot in which it belongs. In an embodiment, no user-specific data and other signaling is transmitted during the time the pilot bursts are transmitted. User-specific data and other signaling can be transmitted in the remaining time intervals in the slot not occupied by the pilot bursts.

FIG. 2B further shows active transmission of user-specific data for all slots in the time period shown. As also illustrated in FIG. 2B, the pilot bursts are transmitted at or near the maximum transmit power level of the access point. This high power level allows the access terminals to quickly and accurately estimate the quality of the pilot reference from the access point.

FIG. 2C is a diagram of a transmission from an access point in which some of the slots are idle (i.e., no transmission of user-specific data). An idle slot may result if no data is to be transmitted to any access terminal in the cell. In the embodiment shown in FIG. 2C, the pilot bursts are still transmitted for each idle slot so that the access terminals can continue to estimate the link conditions and request transmission from the best serving access point (i.e., the access point with the best link) if a data transmission is subsequently desired. As indicated in FIG. 2C, the pilot bursts for the idle slots are transmitted at or near the maximum transmit power level of the access point and at the same predetermined time intervals, as if the slots were active.

Figure 2D:
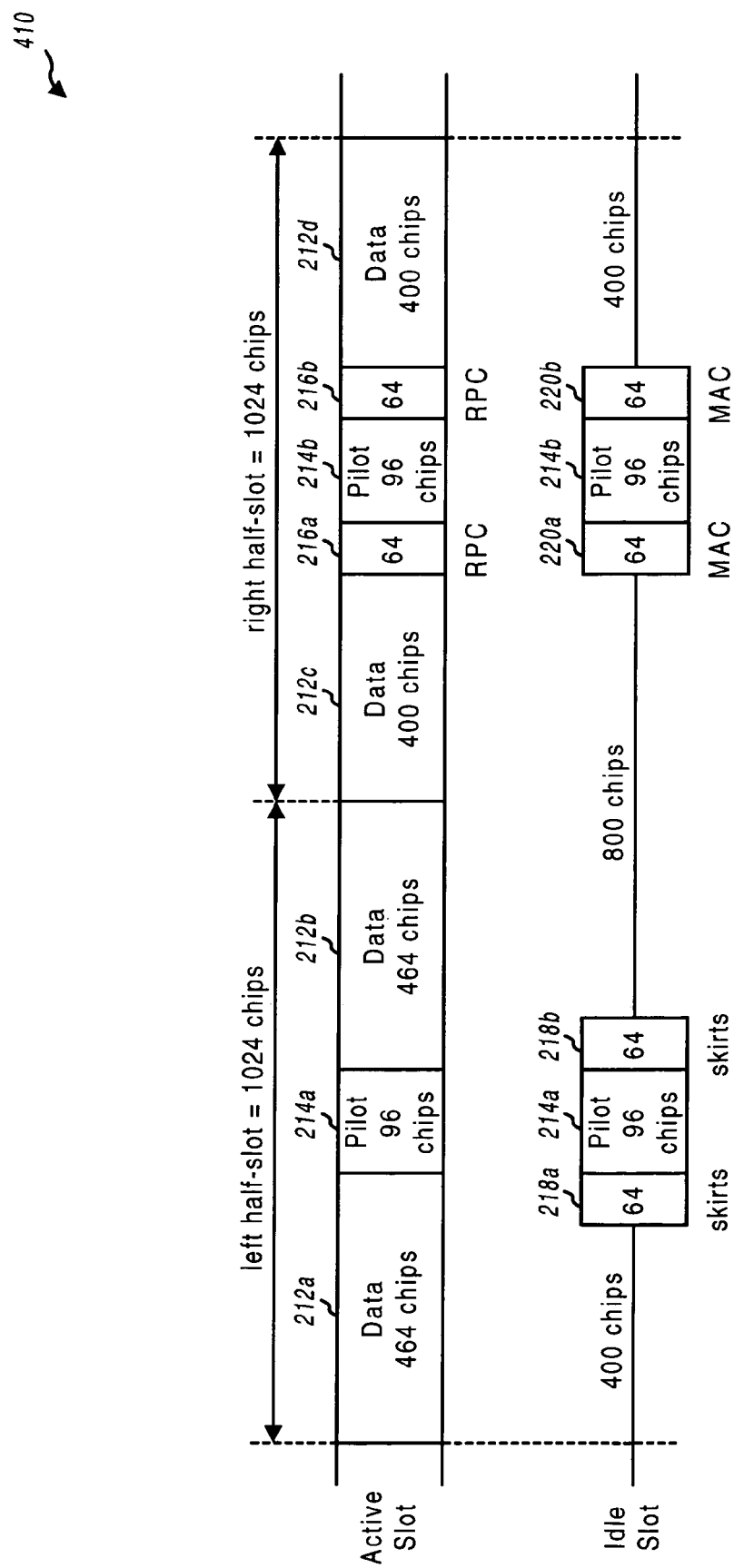
FIG. 2D is a diagram of a slot format defined by an HDR system and which can be used to implement the pilot reference transmission scheme of the invention.

FIG. 2D is a diagram of a slot format defined by the HDR system and which can be used to implement the pilot reference transmission scheme of the invention. In the specific embodiment shown in FIG. 2D, each active slot is divided into two half-slots, with each half-slot including two data partitions 212 separated by a pilot burst 214. Data partitions 212 can be used to transmit user-specific data and signaling, and pilot bursts 214 can be used to transmit the pilot reference.

The first (i.e., left) half-slot includes data partitions 212a and 212b separated by pilot burst 214a, and the second (i.e., right) half-slot includes data partitions 212c and 212d separated by pilot burst 214b. The width of each pilot burst can be selected based on various factors such as, for example, the amount of energy desired to be transmitted in each burst, the maximum transmit power level from the access point, the desired received quality for the pilot burst, the expected worse-case link conditions, the amount of overhead to be allocated for the pilot reference, and so on. For a particular maximum transmit power level, a wider pilot burst corresponds to a higher quality received pilot reference but more overhead. In a specific embodiment (and as implemented in the HDR system), each pilot burst comprises 96 chips of a particular data pattern (e.g., all zeros ("0") data).

In the embodiment shown in FIG. 2D, the second half-slot further includes two signaling bursts 216a and 216b placed on both sides of pilot burst 214b and used to implement a signaling channel. The signaling channel may be used, for example, to transmit reverse power control (RPC) information when the slot is active and Media Access Control (MAC) information when the slot is idle. The RPC information is used to direct the access terminals to adjust their transmit power either up or down to achieve the desired signal quality at the receiving access point.

As shown in the lower half of FIG. 2D, each idle slot is also divided into two half-slots, and each half-slot also includes one pilot burst 214 of the same width (e.g., 96 chips) and located in the same position in the half-slot as in the active slot. The pilot bursts for the idle slot are thus essentially indistinguishable from the pilot bursts for the active slot.

In the embodiment shown in FIG. 2D, two skirts 218a and 218b are positioned on both sides of pilot burst 214a in the first half-slot of the idle slot, and two signaling bursts 220a and 220b are placed on both sides of pilot burst 214b in the second half-slot. Skirts 218a and 218b can comprise pilot data or other data (e.g., pseudo-random data) and are used to provide a transition period between no transmission and pilot transmission and from pilot transmission to no transmission. This transition period allows the pilot reference to reach or be near its steady state value for the duration of the (e.g., 96-chip) pilot burst. If MAC channel or some other channel is always transmitted (at the same power as the pilot) around the pilot bursts, then idle-skirts will not be necessary.

The width of each skirt 218 can be selected based on the overall step response of the (analog and digital) filters used to filter the data and pilot prior to transmission. In the embodiment shown in FIG. 2D, each skirt is 64 chips in duration. If additional time is needed for the pilot reference to reach its steady state value, skirts 218 can be widened and additional skirts can also be placed around signaling bursts 220a and 220b in the second half-slot.

Figure 3:
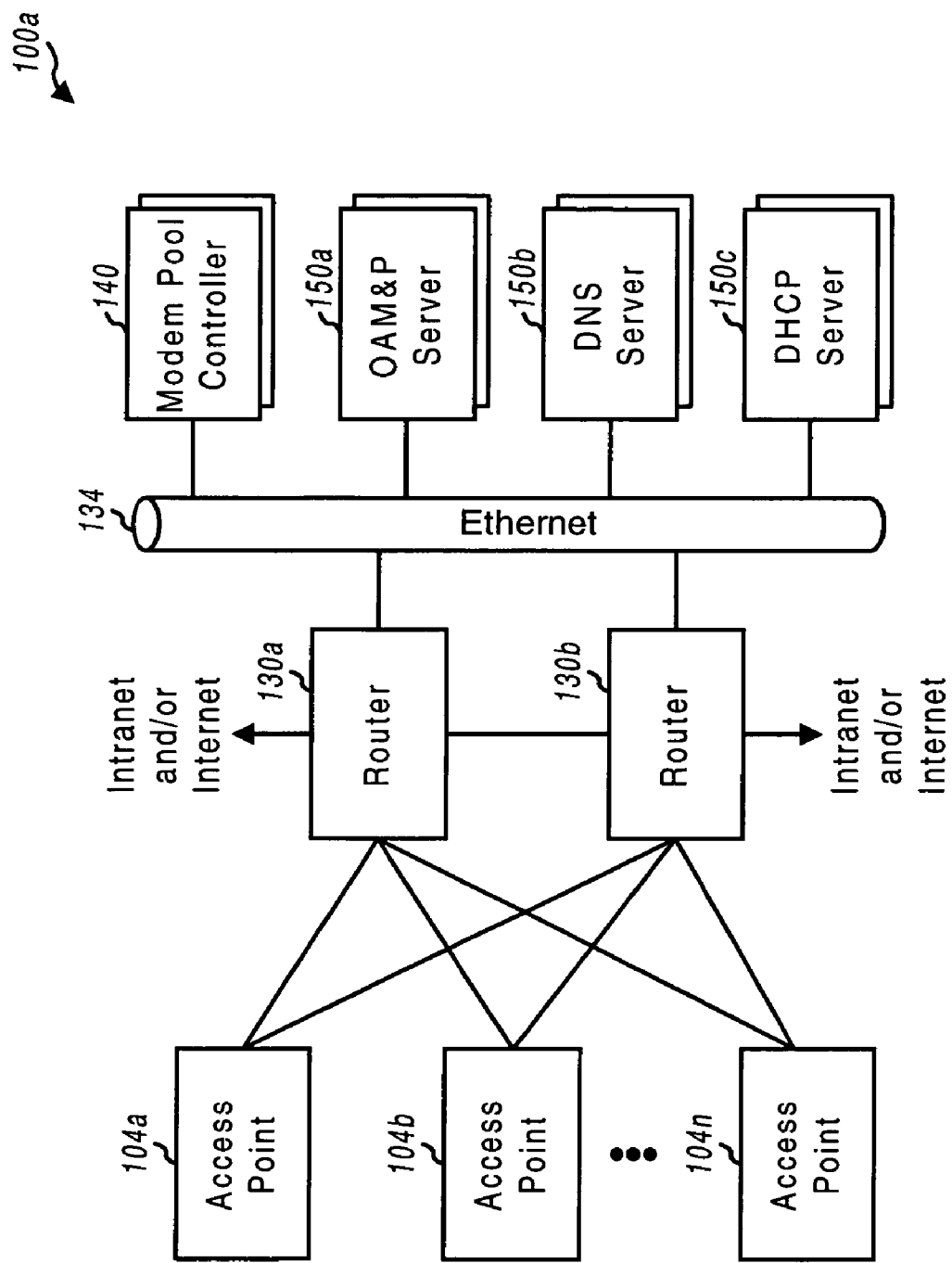
FIG. 3 is a block diagram of an embodiment of a communication system, which is a specific implementation of the system shown in FIG. 1 and which can implement the pilot reference transmission scheme of the invention.

FIG. 3 is a block diagram of an embodiment of a communication system 100a, which is a specific implementation of system 100 in FIG. 1 and which supports the pilot reference transmission scheme of the invention. As shown in FIG. 3, a number of access points 104 are coupled to, and communicate with, a number of consolidation routers 130. Each access point 104 couples to one or more routers 130 via high-speed communication links (e.g., T1/E1, Ethernet, or some other links). To provide redundancy and improve reliability, each access point 120 may be coupled to two or more routers 130, and each router 130 may be coupled in parallel with another router. Each router 130 directs traffics among the access points to which it couples and other network elements and networks coupled to it, such as the Internet. Routers 130 further couple to a (e.g., IP over Ethernet) network 134 that further couples to a modem pool controller 140 and a number of servers 150.

Modem pool controller 140 provides functionality analogous to that of a base station controller (BSC) and a Visitor Location Register (VLR) in an IS-41 network, and can support one or more access points 104. Modem pool controller 140 terminates the Radio Link Protocol (RLP) that contains user traffic, controls the air-link connection for each connected user as the user moves throughout the system, transports access terminal specific messages, and provides MAC functions such as, for example, reverse link outer loop power control synchronization.

Modem pool controller 140 further performs many of the functions typically performed by a conventional BSC for a session such as, for example, session control, connection control, selection functions, and protocol stack maintenance. In an embodiment, for a particular session between an access terminal and system 100$a$, only one (i.e., the "anchor") modem pool controller 140 has control of the session at any particular moment.

Servers 150 support the operation of system 100$a$ and may includes, for example, an Operating Administration, Maintenance, and Provisioning (OAM&P) server 150$a$ used for configuration and management of system 100$a$, a Domain Name System (DNS) server 150$b$ that translates domain names into IP addresses, and a Dynamic Host Configuration Protocol (DHCP) server 150$c$ that assigns IP addresses to access terminals if and as they are needed.

The elements of system 100$a$ are described in further detail in the aforementioned U.S. patent application Ser. No. 09/575,073.

Access Point

Figure 4:
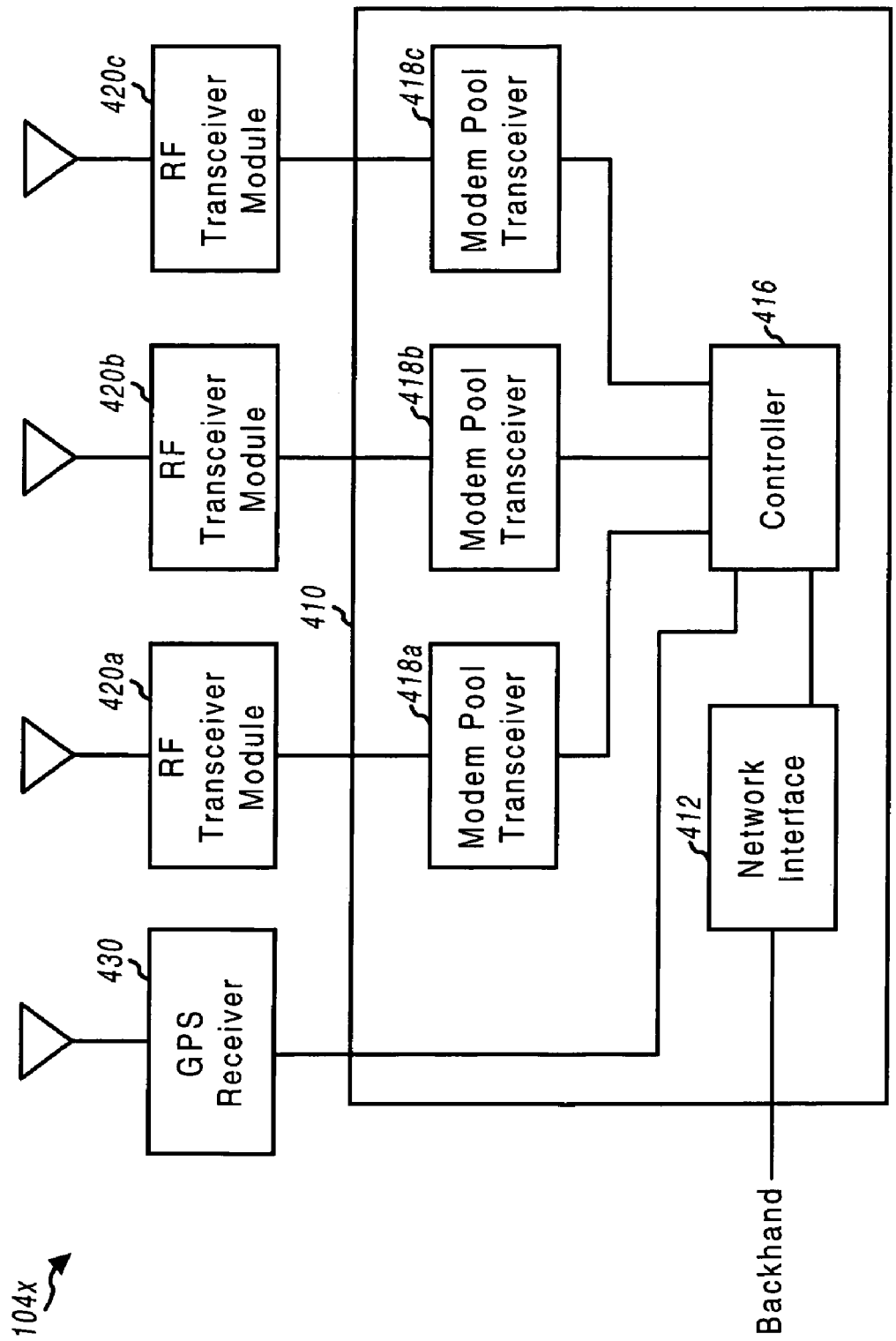
FIG. 4 is a simplified block diagram of a specific embodiment of an access point.

FIG. 4 is a block diagram of a specific embodiment of access point 104$x$, which is one of the access points in FIG. 1. In this embodiment, access point 104$x$ includes a main unit 410 coupled to a number of RF transceiver modules 420 and a GPS receiver 430.

Main unit 410 includes a network interface 412, a controller 416, and a number of modem pool transceivers (MPTs) 418 (three MPTs are shown in FIG. 4). Each MPT 418 performs data processing and supports a respective sector of a cell. In the forward path, MPT 418 receives (e.g., IP) packets from the backhaul link via network interface 412 and processes the packets to generate a modulated RF signal suitable for transmission. Each MPT 418 further couples to a respective RF transceiver module 420 that conditions the RF signal and further interfaces with an associated antenna. Network interface 412 provides the protocols and transports to interface access point 104$x$ with the external network (e.g., router 130 in FIG. 3). Controller 416 performs the radio link controller functions such as, for example, call processing, selection processing, and others.

Each MPT 418 can further be designed to generate the pilot reference for access point 104$x$. For many CDMA-based systems, the pilot reference for an access point is typically generated based on a particular pilot data pattern (e.g., an all zeros "0" sequence for the IS-95 and HDR systems). The pilot data is then covered with a particular orthogonal code assigned for the pilot (e.g., a Walsh cover of zero "0" for the IS-95 and HDR systems). The covered data (which constitutes a sequence of all zeros if a pilot data sequence of all zeros and a Walsh cover of zero are used) is then spread with a particular PN sequence assigned to the access point.

As shown in FIG. 4, access point 104$x$ may further include GPS receiver 430 that provides synchronization with the Global Positioning System (GPS) satellite constellation. GPS receiver 430 receives one or more signals from the GPS satellite constellation and processes the received signals to recover timing information from the GPS satellite constellation. The recovered timing information is then provided to controller 416 and can be used to synchronize the internal clock of access point 104$x$ with the timing of the GPS satellite constellation. This timing synchronization can be achieved in a manner known in the art.

Using the GPS satellite constellation to provide the timing information, the timing reference for all access points in the communication system can be derived from, and synchronized to, a single common source. By synchronizing the timing of each access point to the timing of the GPS satellite constellation, neighboring access points can be synchronized and their pilot bursts can be aligned.

In the event that synchronization with the GPS satellite constellation is lost, access point 104$x$ can "freewheel" and maintain synchronization with other access points for a particular time period (e.g., six hours or more). This synchronization can be achieved by receiving periodic timing signals from the modem pool controller, by maintaining a very precise time base at the access point, by some other mechanisms, or a combination thereof.

The elements of access point 104$x$ are described in further detail in the aforementioned U.S. patent application Ser. No. 09/575,073.

Access Terminal

Figure 5:
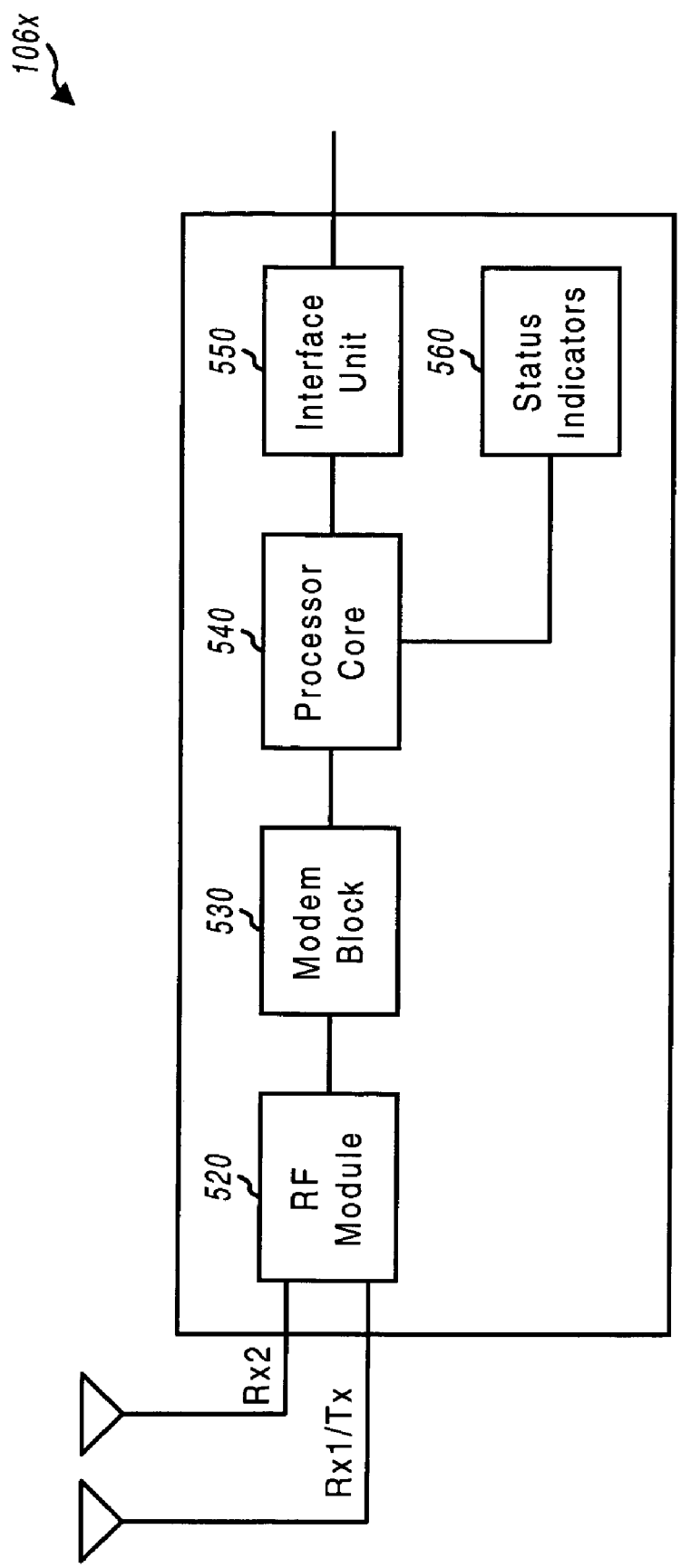
FIG. 5 is a simplified block diagram of a specific embodiment of an access terminal.

FIG. 5 is a simplified block diagram of a specific embodiment of access terminal 106$x$. Access terminal 106$x$ can be a cellular telephone, a data transceiver unit, or some other device or module. Access terminal 106$x$ includes one or more antennas 510, an RF module 520, a modem block 530, a processor core 540, and an interface unit 550 coupled in series. Processor core 540 further couples to status indicators 560.

In an embodiment, RF module 520 includes two receive chains capable of processing two received signals independently and one transmit chain for processing a reverse link signal. The two autonomous receive chains allow access terminal 106$x$ to benefit from receive diversity combining in the forward link. Each of the receive chains couples to a respective antenna that provides one of the received signals. The transmit chain shares an antenna with one of the receive chains.

Modem block 530 processes the signals on the forward and reverse links. On the forward link, modem block 530 receives two autonomous signals from RF module 520, demodulates and decodes the received signals with the assistance of processor core 540, and forwards the decoded data to processor core 540 for further processing.

Modem block 530 further processes the received signals to recover the pilot references from the access points. Modem block 530 typically digitizes the received signals to generate samples. To recover the pilot reference for a selected access point, the samples are despread with a PN sequence at the particular offset associated with the selected access point, which isolates the pilot reference from the selected access point and removes the pilot references from other access points. The despread samples are then decovered with the orthogonal cover used at the selected access point and further correlated with the pilot data pattern used at the selected access point. If the pilot data is a sequence of all zeros and the orthogonal cover is zero, the pilot reference can be obtained by accumulating the despread samples over the width of each pilot burst. Pilot processing in a CDMA-based system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," assigned to the assignee of the invention and incorporated herein by reference.

Processor core 540 performs the call processing, modem initialization, and monitoring functions, and further performs the data processing and handling functions for access terminal 106x. Interface unit 550 provides interconnection between access terminal 106x and peripheral devices (e.g., a computer). Status indicators 560 provide indications of the operating state and conditions of access terminal 106x.

The elements of access terminal 106x are described in further detail in the aforementioned U.S. patent application Ser. No. 09/575,073.

The elements of the access points and access terminals can be implemented in various manners. For example, these elements can be implemented using one or more application specific integrated circuits (ASICs), digital signal processors (DSPs), micro-controllers, microprocessors, other electronic circuits designed to perform the functions described herein, or a combination thereof. Also, some of the functions described herein can be implemented with a general-purpose processor or a specially designed processor operated to execute instruction codes that achieve the functions described herein. Thus, the elements of the access points and access terminals described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for transmitting pilot references from a plurality of transmission sources in a wireless communication system, the method comprising:
   generating at each transmission source a plurality of pilot bursts for a pilot reference; and
   transmitting the plurality of pilot bursts from each transmission source at predetermined times, wherein pilot bursts from the plurality of transmission sources are aligned at each of the predetermined times.

2. The method of claim 1, further comprising receiving at each transmission source one or more signals indicative of a time reference for the communication system, wherein the plurality of pilot bursts from each transmission source are transmitted in synchronization with the time reference.

3. The method of claim 1, wherein each of the plurality of pilot bursts has a predefined width.

4. The method of claim 1, wherein each pilot burst is transmitted at or near a maximum transmit power level of the transmission source.

5. The method of claim 1, further comprising:
   withholding data transmission at each access point during transmission of the pilot bursts.

6. The method of claim 1, further comprising:
   processing at each transmission source pilot data in accordance with a particular processing scheme such that the pilot reference from each transmission source is differentiated from pilot references from other transmission sources.

7. The method of claim 6, wherein the processing at each transmission source comprises:
   spreading the pilot data with a pseudo-noise (PN) sequence at a particular offset that is different from offsets for other transmission sources.

8. The method of claim 1, further comprising:
   continuing transmission of the plurality of pilot bursts from a particular transmission source even if no data is to be transmitted from the transmission source.

9. The method of claim 1, wherein transmission from each transmission source occurs over slots, and wherein each slot covers a particular time period and includes a particular number of pilot bursts.

10. The method of claim 9, wherein each slot includes two pilot bursts.

11. The method of claim 9, wherein each pilot burst is associated with a respective portion of the slot and positioned in the center of the associated portion.

12. The method of claim 9, further comprising:
   padding both sides of each pilot burst in an idle slot with additional transmissions of at least a particular minimum period.

13. The method of claim 1, further comprising:
   transmitting immediately on both sides of each pilot burst to ensure that the pilot burst is received at or near its steady state value.

14. The method of claim 2, wherein the one or more signals used to derive the time reference for the communication system are received from a Global Positioning System (GPS) satellite constellation.

15. A method for transmitting pilot references from a plurality of transmission sources in a wireless communication system, the method comprising:
   at each transmission source:
      processing one or more received signals to derive a time reference for the communication system,
      generating a plurality of pilot bursts for a pilot reference, and
      transmitting the plurality of pilot bursts at predetermined times and in synchronization with the time reference, wherein pilot bursts from the plurality of transmission sources are aligned at each of the predetermined times.

16. A wireless communication system comprising:
   a plurality of access points, each access point configured to:
      generate a plurality of pilot bursts for a pilot reference; and
      transmit the plurality of pilot bursts at predetermined times, wherein pilot bursts from the plurality of transmission sources are aligned at each of the predetermined times.

17. The communication system of claim 16, wherein each access point comprises:
   a Global Positioning System (GPS) receiver configured to receive and process one or more signals from a Global Positioning System (GPS) satellite constellation to provide a signal indicative of a time reference for the communication system.

18. The communication system of claim 17, wherein each access point comprises:
a controller configured to receive the time reference for the communication system and generate the plurality of pilot bursts.

19. The communication system of claim 16, wherein each access point is configured to transmit the plurality of pilot bursts at or near a maximum transmit power level for the access point.

20. An access terminal for use in a wireless communication system, comprising:
an RF module configured to receive a modulated signal over a wireless communication link and to condition the received signal to generate a conditioned signal; and
a modem block coupled to the RF module and configured to process the conditioned signal to recover a plurality of pilot references transmitted from a plurality of access points, wherein the pilot reference from each access point is transmitted in pilot bursts at predetermined times, the pilot bursts from the plurality of access points are aligned at each of the predetermined times, and the pilot bursts from the plurality of access points are received at approximately a same instance in time.

21. The access terminal of claim 20, wherein the modem block is configured to generate samples from the conditioned signal and to despread the samples with a pseudo-noise (PN) sequence at a particular offset for each of the plurality of access points.

22. An access terminal comprising:
means for receiving pilot bursts transmitted from a plurality of access points at predetermined times, the pilot bursts from the plurality of access points are aligned at each of the predetermined times, and the pilot bursts from the plurality of access points being received at approximately a same instance in time;
means for determining a link having a best signal quality based in part on the pilot bursts received; and
means for determining a highest data rate of transmission supported by the link.

23. An access terminal as in claim 22, further comprising:
means for determining an access point associated with the link having a best signal quality.

24. An access terminal as in claim 22, wherein each pilot burst has a predetermined burst width and a predetermined interval, and wherein the predetermined burst width and the predetermined interval are known a priori by the access terminal.

25. An access terminal as in claim 24, wherein each pilot burst is transmitted at approximately a maximum transmit power.

26. An access terminal as in claim 24, wherein no user-specific data is received with the pilot bursts.

27. An access terminal as in claim 24, wherein the pilot bursts from the plurality of access points are synchronized.

28. An access terminal as in claim 22, further comprising:
means for estimating a worst-case carrier to interference ratio from the pilot bursts.

29. An access terminal, comprising:
a modem for receiving pilot bursts from a plurality of access points, wherein the pilot bursts are synchronized and sent at predetermined times, the pilot bursts from the plurality of access points are aligned at each of the predetermined times, and the pilot bursts from the plurality of access points are received at approximately a same instance in time; and
a processor for determining a link having a best signal quality based in part on the pilot bursts received and for determining a highest data rate of transmission supported by the link.

30. An access terminal as in claim 29, wherein the access terminal recognizes the pilot bursts as pilot references.

31. An access terminal as in claim 29, wherein the access terminal uses the pilot bursts to estimate a worst-case carrier to interference ratio.

32. An access terminal, comprising:
a processor; and
a memory storage unit, encoded with computer executable instruction, storing:
a first set of computer-readable instructions for receiving pilot bursts transmitted from a plurality of access points at predetermined times, the pilot bursts from the plurality of access points are aligned at each of the predetermined times, and the pilot bursts from the plurality of access points being received at approximately a same instance in time; and
a second set of computer-readable instructions for determining a link having a best signal quality based in part on the pilot bursts received; and
a third set of computer-readable instructions for determining a highest data rate of transmission supported by the link.

33. An access terminal as in claim 32, the memory storage unit further storing:
a fourth set of computer-readable instructions for determining an access point associated with the link having a best signal quality.

34. An access terminal as in claim 32, wherein each pilot burst has a predetermined burst width and a predetermined interval, and wherein the predetermined burst width and the predetermined interval are known a priori by the access terminal.

35. An access terminal as in claim 34, wherein each pilot burst is transmitted at approximately a maximum transmit power.

36. An access terminal as in claim 34, wherein no user-specific data is received with the pilot bursts.

37. An access terminal as in claim 34, wherein the pilot bursts from the plurality of access points are synchronized.

38. An access terminal as in claim 32, the memory storage unit further storing:
A fifth set of computer-readable instructions for estimating a worst-case carrier to interference ratio from the pilot bursts.

* * * * *